United States Patent [19]

Matsumoto et al.

[11] Patent Number: 5,517,632
[45] Date of Patent: May 14, 1996

[54] REDUNDANT ARRAY OF DISKS WITH IMPROVED STORAGE AND RECOVERY SPEED

[75] Inventors: Toshio Matsumoto; Hiroshi Baba; Kazuhiko Itoh; Shiro Ogura, all of Kamakura, Japan

[73] Assignee: Mitsubishi Denki Kabushiki Kaisha, Tokyo, Japan

[21] Appl. No.: 110,423

[22] Filed: Aug. 23, 1993

[30] Foreign Application Priority Data

Aug. 26, 1992 [JP] Japan ................................ 4-226976

[51] Int. Cl.⁶ .................................................. G06F 12/02
[52] U.S. Cl. ................ 395/441; 395/497.02; 395/497.04
[58] Field of Search ........................ 395/425, 441, 395/481, 497.01, 497.02, 497.04

[56] References Cited

U.S. PATENT DOCUMENTS

| | | | |
|---|---|---|---|
| 4,761,785 | 8/1988 | Clark et al. | 371/2.2 |
| 4,864,572 | 9/1989 | Rechen et al. | 371/2.1 |
| 4,903,234 | 2/1990 | Sakuraba et al. | 395/425 |
| 4,993,030 | 2/1991 | Krakauer et al. | 364/DIG. 1 |
| 5,058,003 | 10/1991 | White | 364/DIG. 1 |
| 5,257,362 | 10/1993 | Menon | 395/425 |
| 5,392,244 | 2/1995 | Jacobson et al. | 371/10.1 |
| 5,408,644 | 4/1995 | Schneider et al. | 395/425 |

FOREIGN PATENT DOCUMENTS

| | | |
|---|---|---|
| 0369707 | 5/1990 | European Pat. Off. . |
| 0481759 | 4/1992 | European Pat. Off. . |
| 485110 | 5/1992 | European Pat. Off. . |
| 0493984 | 7/1992 | European Pat. Off. . |
| WO93/13475 | 7/1993 | WIPO . |

OTHER PUBLICATIONS

Patterson, et al "A Case for Redundant Arrays of Inexpensive Disks" Computer Science Div. U of Cal, Berkley Dec. 1987.
IBM Technical Disclosure Bulletin "Use of Non–Volatile Semiconductor Storage for Disk Array Parity".

*Primary Examiner*—David L. Robertson
*Attorney, Agent, or Firm*—Wolf, Greenfield & Sacks

[57] ABSTRACT

In a redundant array of disks, the disks are divided into areas of different sizes, so that small amounts of data can be stored in an area of an appropriate size on a single disk, instead of being spread over multiple disks. A usage status table indicates which areas are in use. Check information is generated and stored only for areas indicated to be in use. When new check information is generated, it is therefore possible to omit the reading of unnecessary old data and old check information.

18 Claims, 15 Drawing Sheets

FIG.6

| BLOCK | D1 | D2 | D3 | D4 | |
|---|---|---|---|---|---|
| 1 | D11 | | | P1 | } 512 BYTES |
| 2 | | | P2 | | |
| 3 | | D21 | P3 | | |
| 4 | | | P4 | | |
| 5 | | P5 | | | } 1K BYTE |
| 6 | D12 | P6 | | | |
| 7 | | P7 | | | |
| 8 | P8 | | | | } 2K BYTES |
| 9 | P9 | D22 | | | |
| 10 | | | | | |

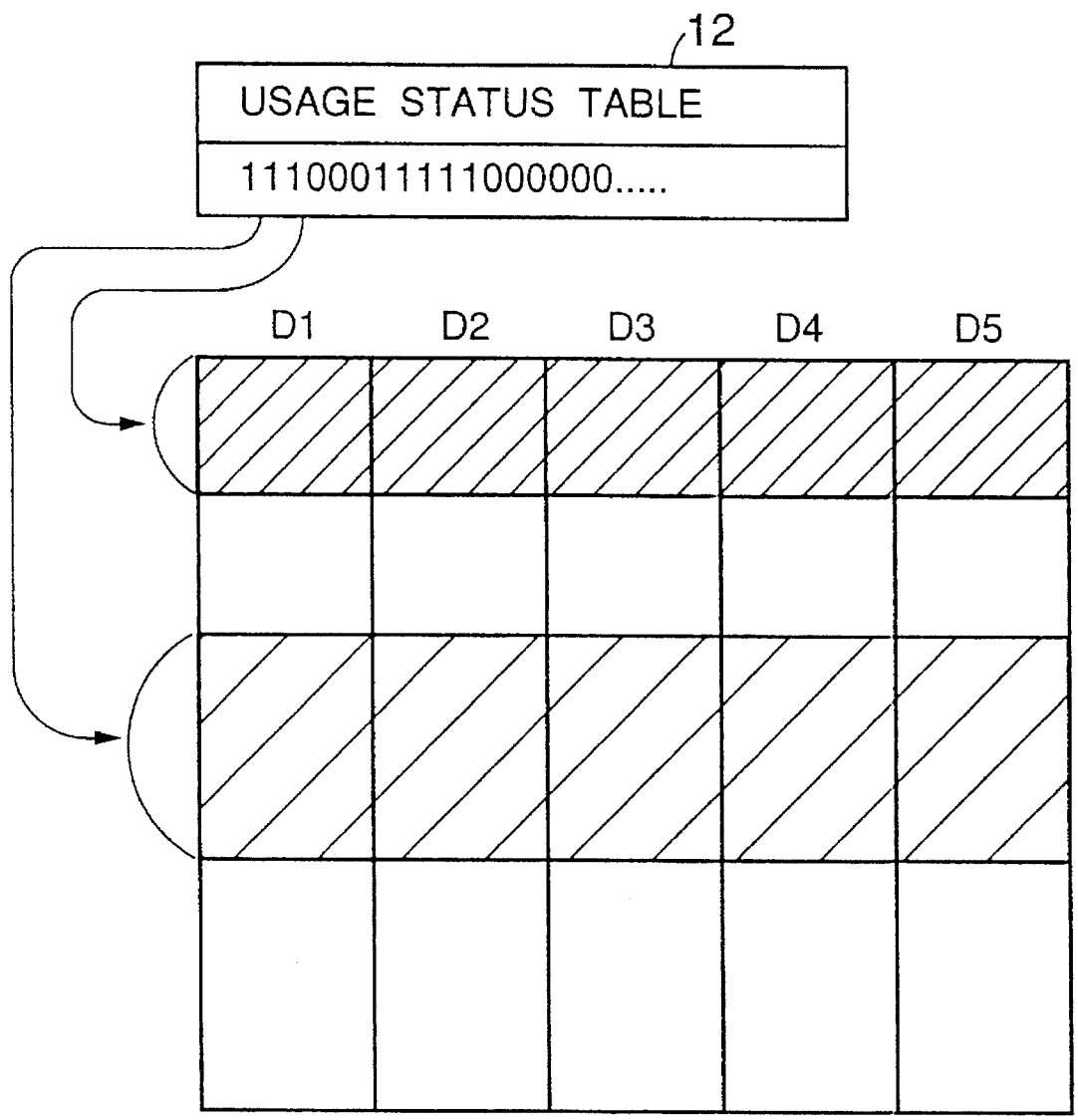

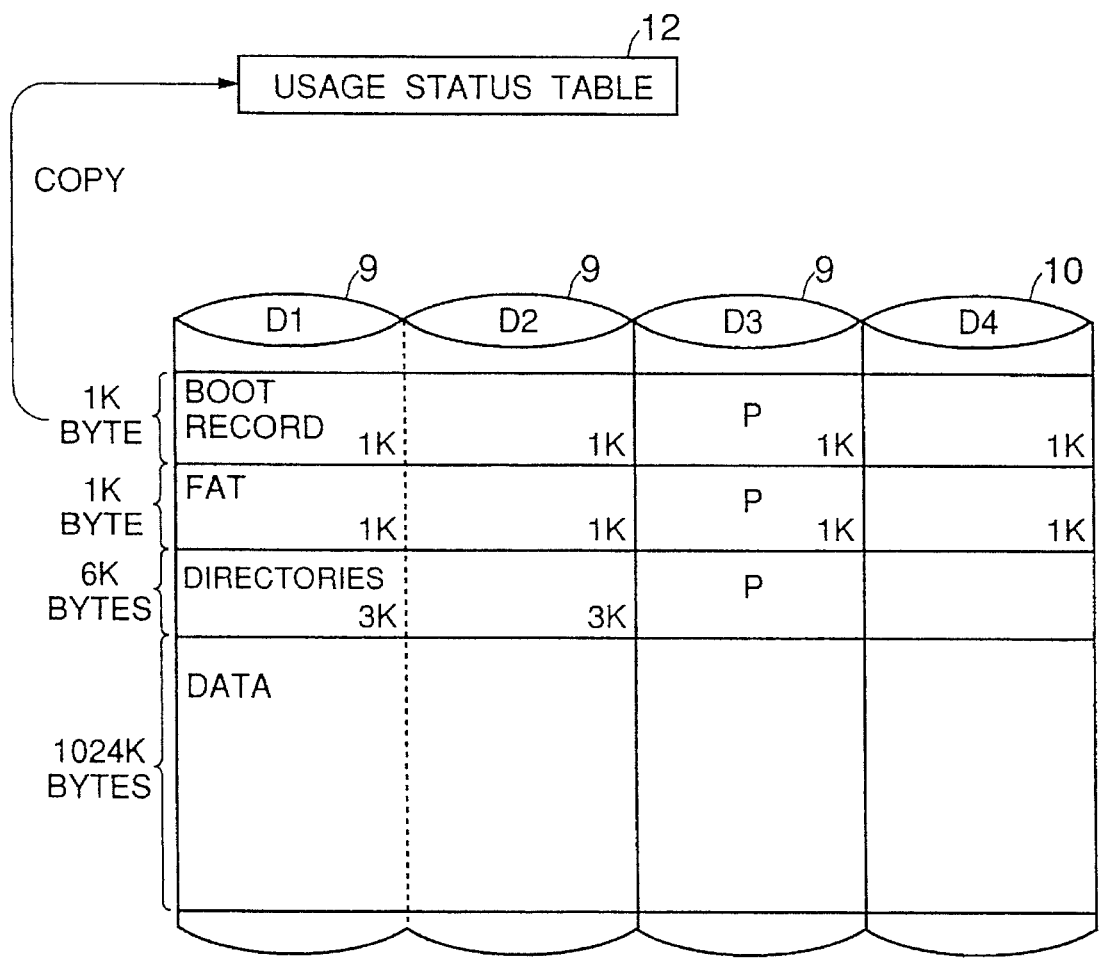

FIG.9

|  | D1 | D2 | 9 (FAILED DISK) D3 | D4 10 |
|---|---|---|---|---|
| 1K BYTE | BOOT RECORD | 01 02 03 04 05 06 07 / 08 09 10 11 12 13 14 / 02 04 00 15 00 07 22 / 00 00 00 00 00 00 00 / 15 16 17 18 19 20 21 / 22 23 24 25 26 27 28 / 17 00 FF 00 00 00 00 / 00 FF 00 00 00 00 00 | P1 | RECONSTRUCTED |
| FAT | FILE NAME A | ATTR. X | DATE DDT TMM | FAT ENTRY 01 | FILE SIZE 5KB | ETC | P2 | RECONSTRUCTED |
|  | B | Y | DDT TMM | 05 | 0KB | ETC | P3 | RECONSTRUCTED |
|  | C | Z | DDT TMM | 06 | 3KB | ETC | P4 | RECONSTRUCTED |
| DIRECTORY AREA | 01 FILE A | 1K | 02 FILE A | 1K | P5 | RECONSTRUCTED |
|  | 03 - | 1K | 04 FILE A | 1K | P6 | RECONSTRUCTED |
|  | 05 - | 1K | 06 FILE C | 1K | P7 (01 XOR 02) | RECONSTRUCTED |
|  | 07 FILE C | 1K | 08 - | 1K | P8 (04) | RECONSTRUCTED |
|  | 09 - | 1K | 10 - | 1K | P9 (06) | RECONSTRUCTED |
|  | 11 - | 1K | 12 - | 1K | P10 (07) | RECONSTRUCTED |
|  | 13 - | 1K | 14 - | 1K | P11 (-) | - |
|  |  |  |  | P12 (-) | - |
|  |  |  |  | P13 (-) | - |

REDUNDANT ARRAY OF DISKS WITH IMPROVED STORAGE AND RECOVERY SPEED

BACKGROUND OF THE INVENTION

This invention relates to methods of storing data in a redundant array of disks, more particularly to methods that speed up time storage of data, and the recovery of data from a failed disk.

Many computer systems use arrays of rotating magnetic disks for secondary storage of data. In particular, a redundant array of inexpensive disks (referred to as a RAID) has been shown to be an effective means of secondary storage. RAID schemes have been classified into five levels: a first level in which the same data are stored on two disks (referred to as mirrored disks); a second level in which data are bit-interleaved across a group of disks, including check disks on which redundant bits are stored using a Hamming code; a third level in which each group has only a single check disk, on which parity bits are stored; a fourth level that uses block interleaving and a single check disk per group; and a fifth level that uses block interleaving and distributes the parity information evenly over all disks in a group so that the writing of parity information is not concentrated on a single check disk, The interleaving schemes of RAID levels two to five conventionally imply that a single collection of data, such as a file or record, is distributed across different disks. For example, when a file with a size equivalent to three blocks is stored in RAID level four or five, the three blocks are conventionally written on three different disks, and parity information is written on a fourth disk. This scheme has the advantage that the four disks can be accessed simultaneously, but the disadvantage that access to each disk involves a rotational delay, and the file access time depends on the maximum of these four rotational delays.

For a large file having many blocks stored on each disk, the advantage of simultaneous access outweighs the disadvantage of increased rotational delay, but for a small file the reverse may be true. For small amounts of data, RAID level one. In which identical data are stored on two mirrored disks, is faster than the other RAID levels, which tend to spread the data and check information over more than two disks. RAID level one, however, is highly inefficient in its use of space, since fully half of the disks are redundant.

Write access at RAID levels two to five is slowed by an additional factor: the need to read old data and old parity information in order to generate new parity information. In a conventional system employing RAID level four, for example, all disks are originally initialized to zeros. When data are written thereafter, the check disk in each group is updated so that it always represents the parity of all data disks in its group. Accordingly, when one block of data is written on a data disk, first the old data are read from that block and the corresponding old parity information is read from the check disk; then new parity is computed by an exclusive logical OR operation performed on the old data, old parity, and new data; and finally, the new data and new parity are written to the data disk and check disk. Write access to a single block therefore entails two read accesses and two write accesses, with one full rotation of the disks occurring between the read and write accesses.

Redundant arrays usually have standby disks for the replacement of disks that fail during operation. The data on a failed disk are conventionally reconstructed by reading the entire contents of all other disks in the same group and performing an operation such as an exclusive logical OR; then the reconstructed data are written onto a standby disk. This method has the advantage of placing the standby disk in exactly the same state as the failed disk, but the disadvantage of taking considerable time, even if the failed disk contained only a small amount of data. The process of replacing the failed disk and reconstructing its data is usually carried out during system operation, so system performance suffers in proportion to the time taken.

SUMMARY OF THE INVENTION

It is accordingly an object of the present invention to improve the speed of access to small amounts of data in a redundant array of disks.

Another object of the invention is to improve the speed of write access in a redundant array of disks.

Still another object of the invention is to improve the speed of recovery from a disk failure in a redundant array of disks.

According to a first aspect of the invention, the disks in a redundant array are partitioned into areas of at least two different sizes. When a command to store a certain quantity of data is received, areas are selected so as to minimize the number of selected areas, and the data are stored in the selected areas. Small amounts of data are thereby stored in a single area of an appropriate size on a single disk.

According to a second aspect or the invention, certain areas are designated for storing data, and other areas for storing check information. Check information is stored only for data areas that are actually in use. A usage status table maintained in a semiconductor memory indicates which data areas are in use and which are not. The usage status table is consulted to determine whether old data and old check information must be read in order to generate new check information when new data are stored. Reading of unnecessary old data and check information is thereby avoided.

According to a third aspect of the invention, the usage table is also consulted to decide which data to reconstruct when a disk fails. Data areas are reconstructed only if they are in use, thereby shortening both the reconstruction process and the process of writing the reconstructed data onto a standby disk.

According to a fourth aspect of the invention, when new data to be stored are received from a host computer, the data are first written onto selected data areas and the host computer is notified that the data have been stored. Afterward, data are read from other areas as necessary to compute new check information, and the check information is written on the corresponding check areas.

According to a fifth aspect of the invention, check information is generated and written only at periodic intervals.

According to a sixth aspect of the invention, check information is stored on a solid-state disk.

BRIEF DESCRIPTION OF THE DRAWINGS

FIG. 6 illustrates still another partitioning of the disks into different-sized areas.

FIG. 7 illustrates the function of the usage status table.

FIG. 8 illustrates the copying of information from a file allocation table into the usage status table.

FIG. 9 is a more detailed drawing showing the contents of the file allocation table.

DETAILED DESCRIPTION OF THE INVENTION

Figure 1:
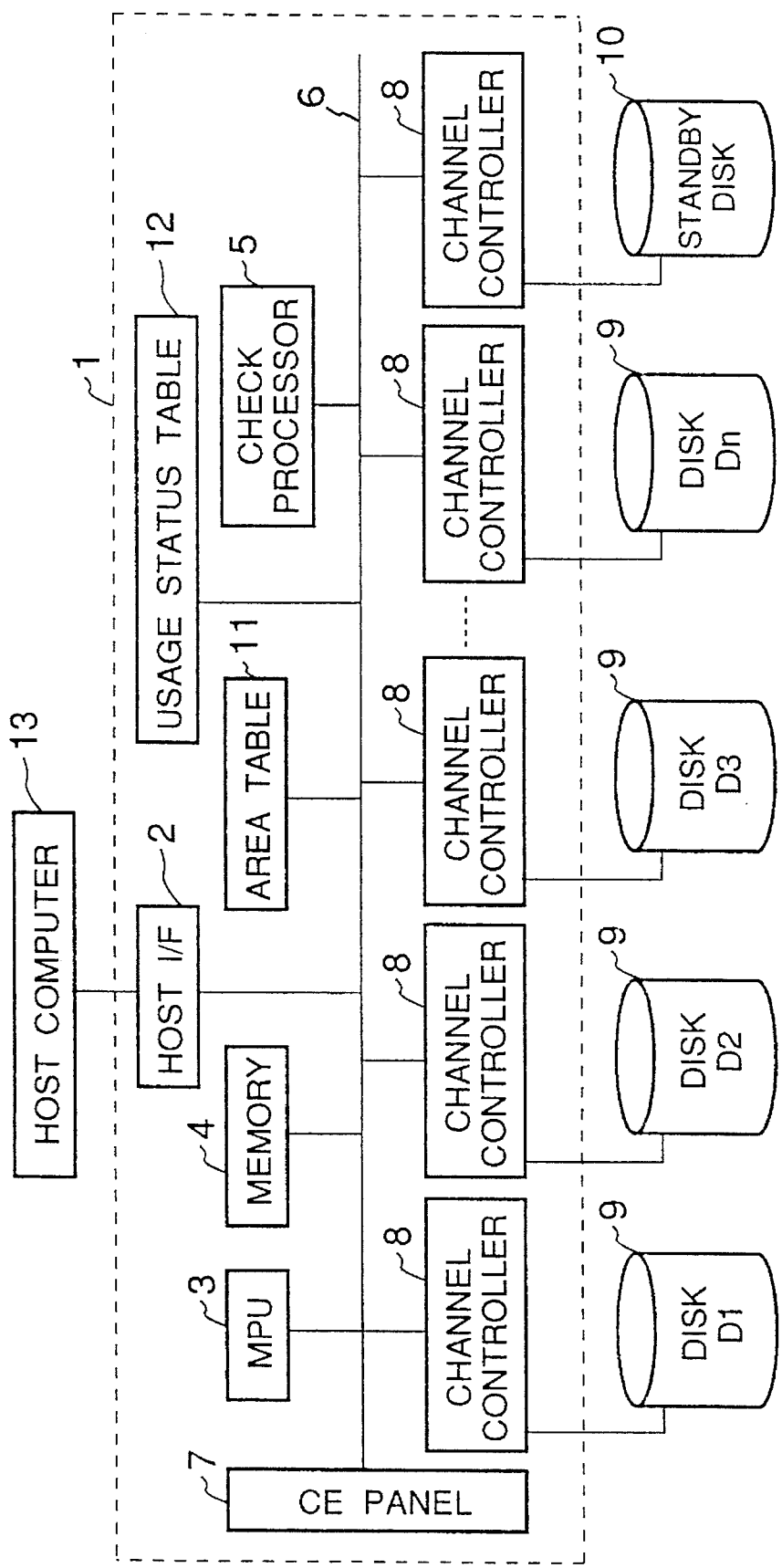
FIG. 1 is a block diagram illustrating a redundant array of disks according to the invention.

The invented methods of storing and recovering data will now be described with reference to the attached drawings. These drawings illustrate novel implementations of RAID levels four and five, so the check information is parity information, indicated by the letter P. The term "check information" will be employed, however, because the invention is not limited to the use of parity information. Nor is the invention limited to the structures shown in the drawings, or to RAID levels four and five.

Referring to FIG. 1, the invention can be practiced in a redundant array off disks with an array controller 1 comprising a host interface 2, a microprocessor 3, a semiconductor memory 4, a check processor 5, a data bus 6, a customer engineering panel 7, and a plurality of channel controllers 8 which control a plurality of disks 9 and at least one standby disk 10. The array controller 1 also has an area table 11 and a usage status table 12, but some of the invented methods do not require the area table 11, some do not require the usage status table 12, and some do not require either the area table 11 or the usage status table 12.

The host interface 2 couples the redundant array to a host computer 13 from which the array controller 1 receives commands to store and fetch data. These commands are carried out by the microprocessor 3 by executing programs stored in the microprocessor's firmware, or in the memory 4. The memory 4 also stores data received from the host computer 13 prior to storage on the disks 9, and data read from the disks 9 prior to transfer to the host computer 13. The check processor 5 generates check information for data to be stored on the disks 9, and checks data read from the disks 9. If the check information is parity information, which will be true in all the embodiments to be described, the check processor 5 comprises logic circuits adapted to perform exclusive OR operations.

The data bus 6 couples the host interface 2, microprocessor 8, memory 4, and check processor 5 to one another, to the customer engineering panel 7, which is used for maintenance purposes, and to the channel controllers 8. Each channel controller is coupled to one or more disks, on which it reads anti writes data. For simplicity, the drawing shows each channel controller coupled to a single disk, but in general there may be multiple disks per channel, and multiple channels per disk. The disks 9 and standby disk 10 in FIG. 1 are all rotating magnetic disks, such as disks conforming to the Small Computer Systems interface (SCSI) standard. In general, however, the array may have one or more additional solid-state disks, as will be shown later, and rotating optical or magneto-optical disks may be used in addition to, or instead of, rotating magnetic disks.

The area table 11 and usage status table 12 are stored in semiconductor memories comprising, for example, dynamic random-access memory devices (DRAMs), which are volatile, or flash memory devices, which are non-volatile. A volatile memory loses its contents when power is switched off; a non-volatile memory retains its contents even without power.

Figure 2:
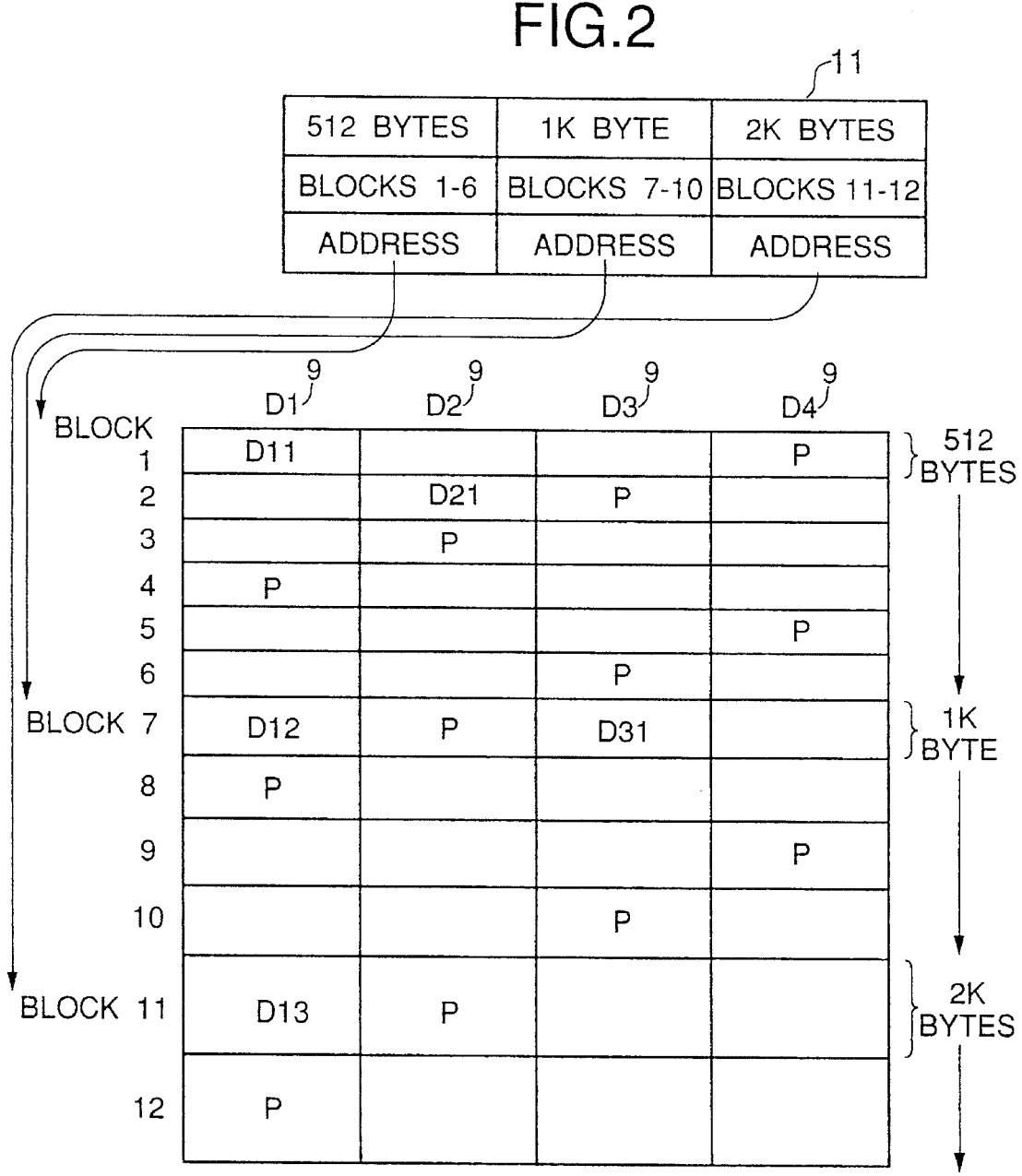
FIG. 2 illustrates a partitioning of the disks into different-sized areas.

Referring next to FIG. 2, according to the first invented method of storing data, each disk 9 is partitioned into areas of at least two different sizes, three different sizes being shown in the drawing. In this drawing an area is synonymous with a block, a block being an area that is always written or read as a single unit when accessed. The term sector is often used with the same meaning as block. A common block size on a conventional magnetic disk is 512 bytes, but the disks in FIG. 2 are partitioned into 512-byte blocks, 1-kbyte blocks, and 2-kbyte blocks.

The four disks shown in FIG. 2 are not meant to represent the entire redundant array, but to represent the disks in a single redundant group. A redundant group is a group of disks such that check information stored on one or more disks in the group pertains only to other disks in the same group. A redundant array can comprise any number of redundant groups, and a redundant group can comprise any number of disks. When used below, the word "group" will always mean a redundant group.

Disks D1 to D4 are all identically partitioned, blocks 1 to 6 on each disk having a size of 512 bytes, blocks 7 to 9 having a size of 1 kbyte, and blocks 11 and 12 a size of 2 kbytes. The area table 11 indicates, for each block size, which blocks have that size and where those blocks are disposed on the disks. In this embodiment blocks of the same size are disposed contiguously on each disk.

The blocks marked P are check areas, designated for storing check information. The other blocks are data areas, designated for storing data. The check areas are distributed over all the disks in the group, as in RAID level five. Each check area contains check information for areas with the same block numbers on other disks.

Next the operation of this embodiment in storing data D11 with a size of 256 bytes, data D21 with a size of 500 bytes, data D12 with a size of 640 bytes, and data D13 with a size of 1500 bytes will be described.

When the host computer 13 commands the array controller 1 to store the data D11, the data D11 are first received via the host interface 2 and stored in the memory 4. The microprocessor 3 executes a program that compares the size of the data D11 with the sizes recorded in the area table 11, and selects a minimum number of areas with sufficient total capacity to store the data D11. Since the size of data D11 is 256 bytes, it can be stored in one area, and the program selects an area of the minimum 512-byte size, such as block 1 on disk D11. The microprocessor 3 then commands the channel controller 8 of disk D1 to transfer the data D11 from the memory 4 to disk D1 and write the data in block 1. As soon as the data D11 have been written, the microprocessor 3 notifies the host computer 13 via the host interface 2 that the storing of data D11 is completed.

The microprocessor 3 also commands the check processor 5 to generate check information for data D11, and the channel controller 8 of disk D4 to write this check information in block 1 of disk D4. The writing of check information can be executed either simultaneously with the writing of data D11, or at a later time. The generation and writing of check information will be described in more detail later.

When commanded to store the 500-byte data D21, the microprocessor 3 again selects a single area of the minimum 512-byte size, such as block 2 on disk D2. This time the check information is written on block 2 of disk D3.

When commanded to store the 640-byte data D12, the microprocessor 3 finds that these data cannot be stored in a single 512-byte area, but can be stored in a single 1-kbyte area, so it selects a 1-kbyte area such as block 7 on disk D1 and writes the data there. Check information is written on block 7 of disk D2. This block already contains check information pertaining to data D31, which were stored previously in block 7 on disk D3. This check information is updated so that it now pertains to both data D12 and data D31, as will be explained later.

When commanded to store the 1500-byte data D13, the microprocessor 3 finds that these data cannot be stored in a single 512-byte or 1-kbyte area but can be stored in a single 2-kbyte area, and selects, For example, block 11 of disk D1. Check information is written on block 11 of disk D2.

Since these four data D11, D21, D12, and D13 are all written in single blocks, and since the host computer 13 is notified of completion as soon as the data have been written, the expected rotational delay per write is only the average rotational delay of one disk. In conventional systems with only 512-byte blocks, data D13, for example, would be written in three blocks on three different disks, and the expected rotational delay would be the expected maximum of the rotational delays on three disks, which is higher than the average rotational delay of one disk. Since the average rotational delay per disk normally exceeds the write time per block, shortening the expected rotational delay can significantly speed up the writing of data such as D13. The same advantage is also obtained when data are read. Since the same data may be read many times, the gain in system performance is multiplied many-fold.

If commanded to store more than 2 kbytes of data, the microprocessor 3 will be unable to fit the data into a single block, but it will still select a minimum number of blocks. For example. 5-kbyte data may be stored in three 2-kbyte blocks such as block 12 on disks D2, D3, and D4, with check information written on block 12 of disk D1. If the supply of 2-kbyte blocks is exhausted, then 5-kbyte data can be stored in five 1-kbyte blocks, or ten 512-byte blocks.

As pointed out earlier, while small amounts of data are best stored on a single disk, large amounts are best stored on multiple disks, the advantage of simultaneous access outweighing the increased rotational delay. By allowing up to 2 kbytes of data to be written on a single disk, and larger amounts to be written on two or more disks, the method of FIG. 2 speeds up access to small amounts of data without slowing down access to large amounts of data. The method can be optimized by setting the maximum block size near the point where the trade-off between rotational delay and simultaneous access to different disks shifts in favor of simultaneous access.

Another useful form of optimization is to allocate blocks according to known characteristics of software running on the host computer 13. For example, if it is known that about 70% of the data accessed by the host computer will have a length of 1 kbyte, then about 70% of the total space on the disks 9 can be allocated to 1-kbyte blocks.

Figure 3:
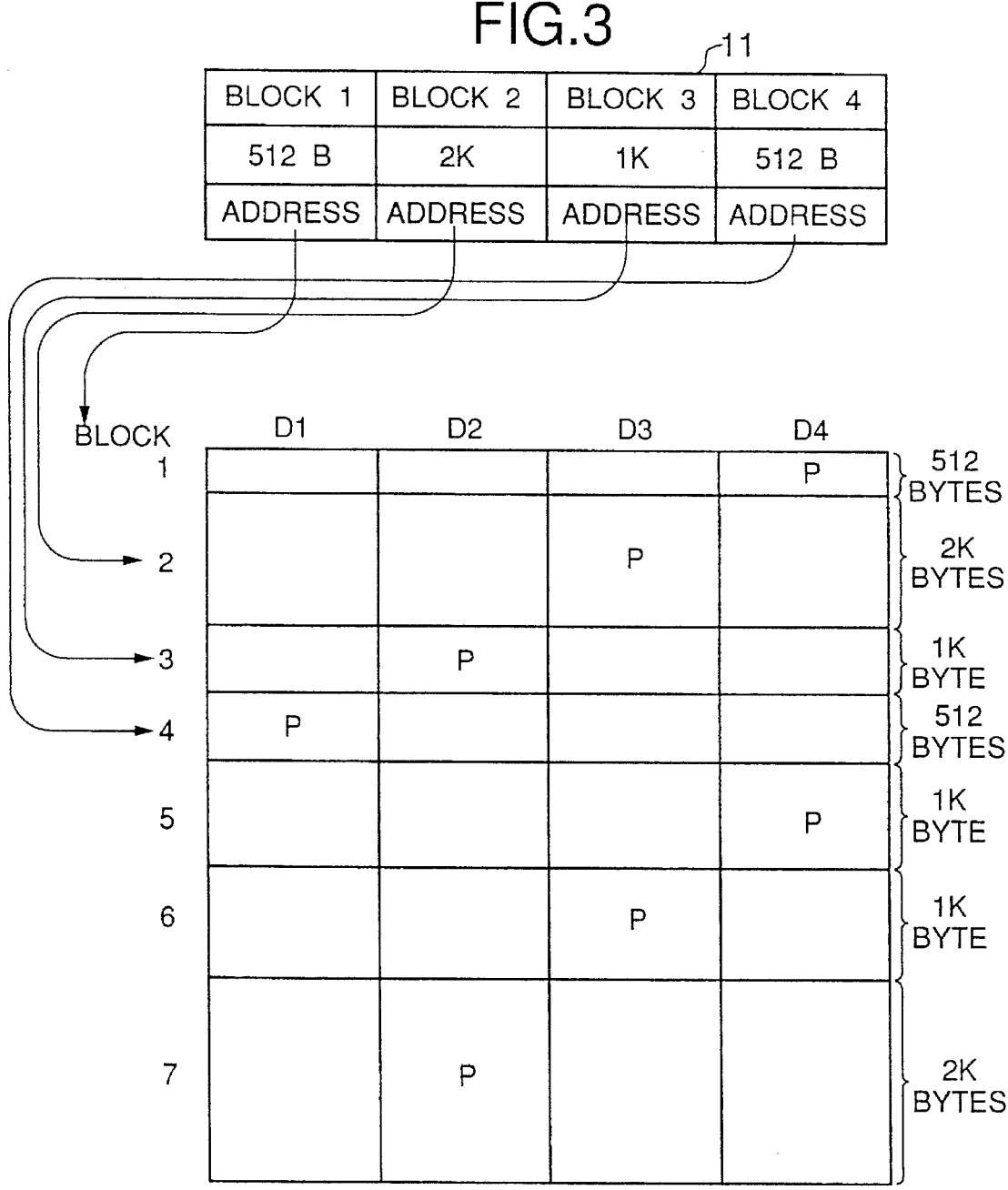
FIG. 3 illustrates another partitioning of the disks into different-sized areas.

FIG. 3 illustrates a modification of this method of storing data in which areas of identical size appear in non-contiguous locations on the disks. This arrangement is advantageous when a single file or record is packed into areas of different sizes. For example, 2500-byte data can be efficiently stored in blocks 1 and 2 of disk D1.

Because of the random arrangement of blocks in FIG. 3, the area table 11 is structured differently from the area table 11 in FIG. 2, now indicating the size and address of each block separately. FIG. 8 shows part of the area table 11, corresponding to the first four blocks on each disk.

Figure 4:
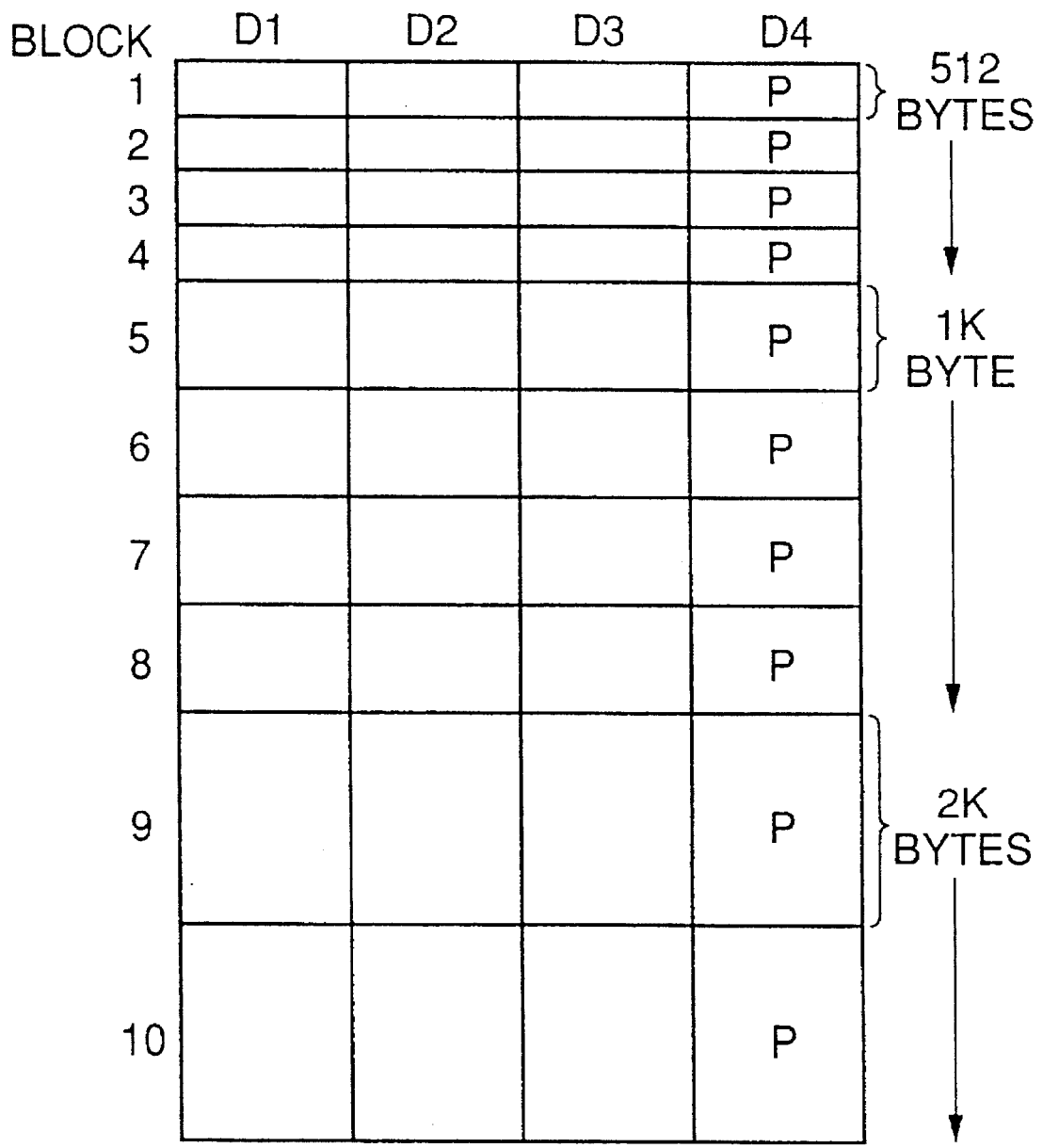
FIG. 4 illustrates still another partitioning of the disks into different-sized areas.

FIG. 4 illustrates an arrangement in which all check information is concentrated on a single disk D4, as in RAID level four. Data are stored by the same method as in FIG. 2. The check disk D4 is partitioned in the same way as the other disks D1 to D3.

In FIGS. 2 to 4 the disks 9 were partitioned into areas as an initial step, before the storage of any data on the disks, but it is also possible to partition the disks dynamically, in response requests for data storage from the host computer 13, as described next.

Figure 5:
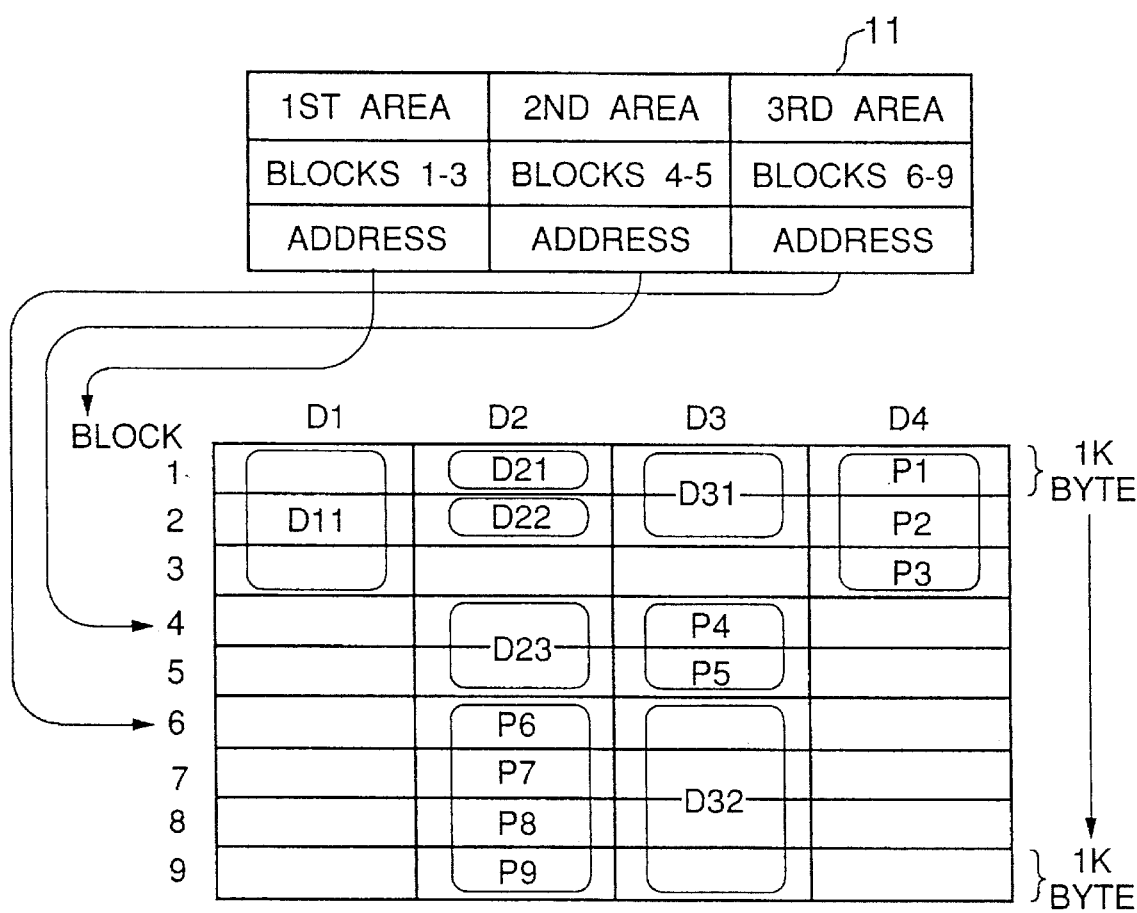
FIG. 5 illustrates yet another partitioning of the disks into different-sized areas.

Referring to FIG. 5, the disks 9 are initially divided into uniform 1-kbyte blocks, but the term block is no longer synonymous with area. A block now denotes the minimum unit of data that can be accessed at one time. After initialization, the disks have been partitioned into blocks but have not yet been partitioned into areas.

If the first command received from the host computer 13 is to store 2500-byte data D11, the microprocessor 3 begins by allocating blocks 1 to 3 as a first area on each of the disks D1, D2, D3, and D4, and recording this allocation in the area table 11. Then it writes data D11 into the first area on disk D1, and writes check information into the first area on disk D4, P1 denoting the check information for block 1, P2 the check information for block 2, and P3 the check information for block 3.

If the next command is to store 640-byte data D21, the microprocessor 3 compares the size of data D21 with the 3-kbyte size of the first areas, sees that the latter will accommodate the former, and selects, for example, the first area on disk D2. Data D2 are stored in block 1 in this area, and check information P1 is updated accordingly.

If the next command is to store 512-byte data D22, the microprocessor 3 selects, for example, the next available block in the already-allocated areas, stores data D22 in block 2 on disk D2, and updates check information P2 on disk D4.

If the next command is to store 2000-byte data D31, the microprocessor 3 is still able to fit these data into a single first area, by using blocks 1 and 2 of disk D3. Data D31 are stored in these blocks, and check information P1 and P2 are updated again.

The next command is to store 2000-byte data D23. Although these data could be stored in block 3 on disk D2 and block 3 on disk D3, that would use two separate areas, so instead, the microprocessor 3 allocates blocks 4 and 5 as a second area on each disk, records this allocation in the area table 11, and stores data D23 in one of the four newly-allocated second areas. The drawing shows data D23 stored in the second area on disk D2, and check information P4 and P5 stored in the second area on disk D3.

The next command is to store 4000-byte data D32. Rather than place these data in blocks 4 and 5 on disks D1 and D4, which would use two separate areas on different disks, the microprocessor 3 again allocates four new areas, comprising blocks 6 to 9 on each disk, and stores data D32 in one of these new areas, such as blocks 6 to 9 on disk D3, recording check information P6, P7, PS, and P9 in the corresponding area of disk D2.

An upper limit can be placed on the size of these dynamically-allocated areas, so that the microprocessor 3 does not impair access to large amounts of data by storing too much data on a single disk.

FIG. 6 shows an example of how dynamic allocation of areas can be combined with variable block size. Blocks 1 to 4 have a size of 512 bytes, blocks 5 to 7 a size of 1 kbyte, and blocks 8 to 10 a size of 2 kbytes. To store 256-byte data D11, the microprocessor 3 allocates block 1 as a 512-byte area on each disk, stores data D11 in this area on disk D1, and stores check information P1 in the corresponding area on disk D4. To store 1500-byte data D21, it allocates blocks 2, 3, and 4 as a second area on each disk, stores data D21 in this area on disk D2, and stores check information P2, P3, and P4 in the corresponding area on disk D3. To store 3000-byte data D12, it allocates blocks 5, 6, and 7 as a third area on each disk, stores data D12 in this area on disk D1, and stores check information P5, P6, and P7 in the corresponding area on disk D2. To store 4-kbyte data D22, it allocates blocks 8 and 9 as a fourth area on each disk, stores data D22 in this area on disk D2, and stores check information P8 and P9 in the corresponding area on disk D1. This arrangement affords great flexibility and allows data to be stored with little wasted space.

Next, efficient methods of generating and writing check information will be described. These methods speed up the processes of storing data and replacing failed disks by eliminating unnecessary reading and writing. These methods can be used together with any of the partitioning schemes shown above, but they can also be used in systems that do not apply those partitioning schemes.

FIG. 7 shows a group of five disks D1 to D5 and the usage status table 12. The usage status table 12 in this embodiment is a bit-mapped table, each bit corresponding to a set of corresponding blocks on all five disks; that is, a set extending horizontally across all disks in the group. A bit value of one indicates that data are stored in the corresponding block on at least one of the disks D1 to D5; a bit value of zero indicates that no data are stored in the corresponding bock on any disk in the group. In the drawing, the first three blocks contain data on at least one disk, as indicated by shading, the next three blocks contain no data on any disk, the next five blocks contain data on at least one disk, and the remaining blocks contain no data.

In this state, if new data are written on one of the shaded areas, either in a vacant part of the area or overwriting existing data in the area, check information can be generated as in the prior art. In writing to a single block, for example, first the old contents of the block are read, and the corresponding old check information is read; then new check information is computed from the new data, old contents, and old check information; then the new data and new check information are written.

If new data are written on one of the unshaded areas, however, check information is generated from the new data alone, and the new data and check information are written on the appropriate blocks without first reading the old contents of those blocks, or reading old check information. Omitting these unnecessary reads greatly speeds up the storage of both large and small amounts of data in areas indicated as unused by the usage status table 12.

If one of the disks, disk D5 for example, fails in the state shown in FIG. 7, its data can be reconstructed by reading the contents of the other four desks, and the reconstructed data can be written on a standby disk (not shown in the drawing). In the prior art the entire contents of the other four disks would be read to reconstruct the entire contents of disk D5. In this embodiment, however, the microprocessor 3 is programmed to refer to the usage status table 12 and read and reconstruct only those blocks indicated by the usage status table 12 to be in use. In FIG. 7 only eight blocks have to be read from each of disks D1 to D4, and only eight blocks have to be written on the standby disk, so the process of recovering from the failure of disk D5 is considerably shortened, and system performance is degraded very little by the recovery process.

Disks are conventionally initialized by writing, for example, all zero data, a procedure that lengthens system setup time. A slight modification of the above method permits time setup time to be greatly shortened. In the modified method, the disks originally contain random data. When data are written on a block indicated by the usage status table 12 to be unused, besides writing data and check information in that block on two or more disks in the group as described above, the microprocessor 3 is programmed to initialize the same block on any other disks in the group.

This modification spreads the initialization process over the life of the disk, and permits much initialization to be omitted entirely. For example, when new data are written simultaneously on the same block on four of the five disks, and check information is written on that block on the fifth disk, no initialization is required whatsoever. This method is particularly advantageous in systems that tend to store large quantities of data at a time.

FIG. 8 illustrates a method of creating a different type of usage status table 12. In this drawing disks D1, D2, and D3 form a redundant group, in which disk D3 is a check disk. Disk D4 is a standby disk. The disks are formatted into 1-kbyte blocks.

The first 1-kbyte blocks on disks D1 and D2 contain a boot record, used to load the host computer's operating system at power-up. The next 1-kbyte blocks on these disks contain a file allocation table (FAT) that indicates where files are stored. The next six 1-kbyte blocks are reserved for directory information. Disk D3 stores check information for the boot record, FAT, and directory information. The rest of the area on disks D1, D2, and D3 is available for the storage of data and the corresponding check information.

The FAT contains block usage information, so a convenient way to create the usage status table 12 is to copy the FAT at power-up, as indicated by the arrow in the drawing. Thereafter, as files are stored, updated, and deleted, the host computer's operating system updates the FAT on disks D1 and D2, and the microprocessor 3 in the array controller makes corresponding updates to the information in the usage status table 12. When power is switched off the FAT on disks D1 and D3 retains the information in the usage status table 12. When power is switched on again, the usage status table 12 is reloaded from the FAT. Thus loss of the information in the usage status table 12 is prevented even if the usage status table 12 comprises volatile memory elements.

FIG. 9 shows the structure of the FAT and directory information in more detail. Information for three files A, B, and C is shown. For each file, the directory gives a file name, file attribute date and time of creation or update, first FAT entry, file size, and possibly other information.

The blocks on disks D1 and D2 are now numbered separately, with odd-numbered blocks on disk D1 and even-numbered blocks on disk D2. The FAT is divided into corresponding entries, numbered 01 to 28 in the drawing. (For convenience, the FAT is now drawn as if it comprised two blocks on each disk.) In the directory, the FAT entry for file A indicates that file A starts in block 01 on disk D1. Referring to the FAT, the contents of this FAT entry is a pointer to 02, indicating that file A continues to block 02 on disk D2. The contents of FAT entry 02 is a pointer to 04, indicating that file A continues from block 02 on disk D2 to block 04 on disk D2. Further pointers in the FAT show that file A continues from block 04 to block 15, then to block 17. The FF entry for block 17 is an end code indicating that this is the last block of the file.

File C is described by a similar pointer chain in the FAT, pointing from block 06 to block 07 to block 22. Entries of 00 in the FAT indicate unused blocks, marked by dashes in the drawing. In particular, the entry 00 for block 05 indicates that no data have yet been stored for file B, as is also indicated by its zero file size in the directory.

FIG. 9 also indicates how check information is generated. The check information is parity information. Check information P7, for example, is generated as the exclusive logical OR (XOR) of the data stored in blocks 01 and 02. Check information P1 to P6 is generated in the same way from the boot record, FAT information, and directory information stored on disks D1 and D2. Check information P8, however, is identical to the contents of block 04 on disk D2, since the corresponding block 03 on disk D1 is not in use. Similarly, check information P9 is identical to the contents of block 06, and check information P10 to the contents of block 07. Since the array controller 1 knows exactly which blocks are in use, it is able to generate check information pertaining to those blocks and to no other blocks. No check information has been generated for blocks 09 to 14, since no data are stored in these blocks. P11, P12, and P13 may contain any values, as indicated by dashes in the drawing.

Next several examples of the writing of new data will be given.

If a new file with a size of 1 kbyte is created and stored in block 11, for example, by referring to the usage status table 12 in which a copy of the FAT is maintained, the microprocessor 3 sees that no data are currently stored in either block 11 or block 12, so it simply writes the new data in block 11 and writes the same new data in the corresponding block of disk D3 as check information. It is not necessary to read any old data or old check information beforehand.

If a new file with a size of 2 kbytes is created and stored in blocks 13 and 14, the microprocessor 3 stores the exclusive logical OR of these data as check information on disk D3, again omitting read access beforehand.

If a new file with a size of 1 kbyte is created and stored in block 03, from the usage status table 12 the microprocessor 3 learns that block 04 is in use. New check information must therefore be generated by taking the exclusive logical OR of the new data with either the existing data in block 04, or the existing check information P8. The microprocessor 3 can be programmed to read either block 04 or P8 while writing the new data in block 03, then take the exclusive logical OR of the read data with the new data (which are stored in the memory 4 in FIG. 1) and write the result as new check information in block P8. In either case, it is not necessary to read the old contents of block 03 before writing new data on block 03.

In all three examples described above, the storage of new data is speeded up because the writing of the new data does not have to be preceded by the reading of any old data or old check information. The host computer 13 is notified that the storage of the new data is completed as soon as the writing of the new data ends, even if the corresponding check information has not yet been written.

Next a method of recovery from a disk failure will be described, assuming that disk D2 fails in the state shown in FIG. 9, before storage of any of the new data mentioned in the foregoing examples. First, the microprocessor 3 and check processor 5 reconstruct the boot record, FAT, and directory information stored on disk D2 by reading the corresponding information from disk D1 and taking its exclusive logical OR with check information P1 to P6, which is read from disk D3. The reconstructed information is written on the standby disk D4. Next, the microprocessor 3 is programmed to refer to the usage status table 12, find out which data blocks of the failed disk D2 were in use, reconstruct the data of those blocks, and write the reconstructed data on a standby disk. For block 02, this entails reading block 01 from disk D1 and check information P7 from disk D3 and taking their exclusive logical OR. For blocks 04 and 06, since no data are stored in the corresponding blocks 03 and 05 on disk D1, it suffices to copy the check information P8 and P9 to disk D4. Blocks 08, 10, 12, and 14 are not reconstructed, because no data were stored in these blocks.

By keeping track of the individual usage status of each data block on each disk. the array controller can skip the reading of unnecessary information when new data are stored, and the reading and writing of unnecessary information when a failed disk is reconstructed. In addition, it is possible to skip all writing of initial data, both when a disk is first installed in the array and afterward, because check information is generated only from blocks in which data are actually stored.

Figure 10:
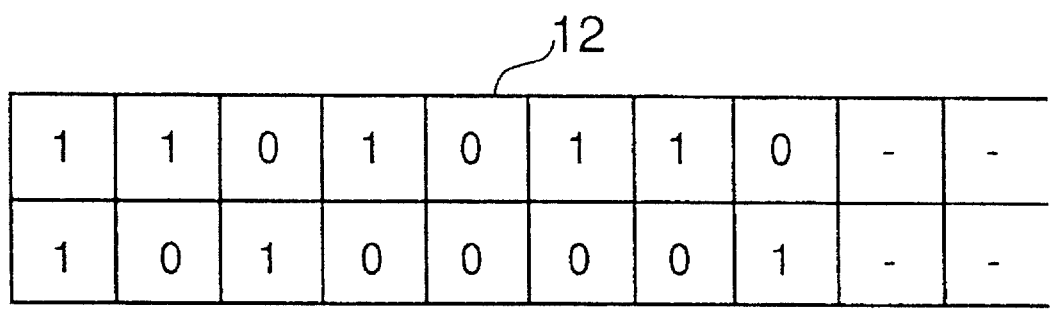
FIG. 10 illustrates a bit-mapped usage status table.

Although it is convenient to copy the FAT to the usage status table 12, a more compact usage status table 12 can be obtained by reducing the FAT contents to a bit-mapped form, by storing a bit value of zero for FAT entries of 00 and a bit value of one for other FAT entries, as illustrated in FIG. 10. In the usage status table 12 in FIG. 10, each bit represents the usage status of one data block on one disk. The values shown indicate that blocks 01 and 02 are in use, block 03 is not in use, block 04 is in use, and so on, the same information as obtained from the FAT in FIG. 9. As before, when the host computer's operating system modifies the FAT on disk. The microprocessor 3 makes corresponding modifications to the usage status table 12.

The usage status table 12 in FIG. 10 can be constructed by reading the FAT at power-up, or the usage status table 12 can be kept in non-volatile memory, such as flash memory or battery-backed-up DRAM, the contents of which are not lost when power is switched off. The latter method is preferable since then the usage status table 12 does not have to be reloaded from the FAT, either at power-up or in recovering from a momentary power failure.

Next, further examples of data storage operations will be given, including examples of the deletion of data. This time a group of four disks D1, D2, D3, and D4 will be considered, in which disks D1, D2, and D3 are data disks and disk D4 is a check disk.

Figure 11:
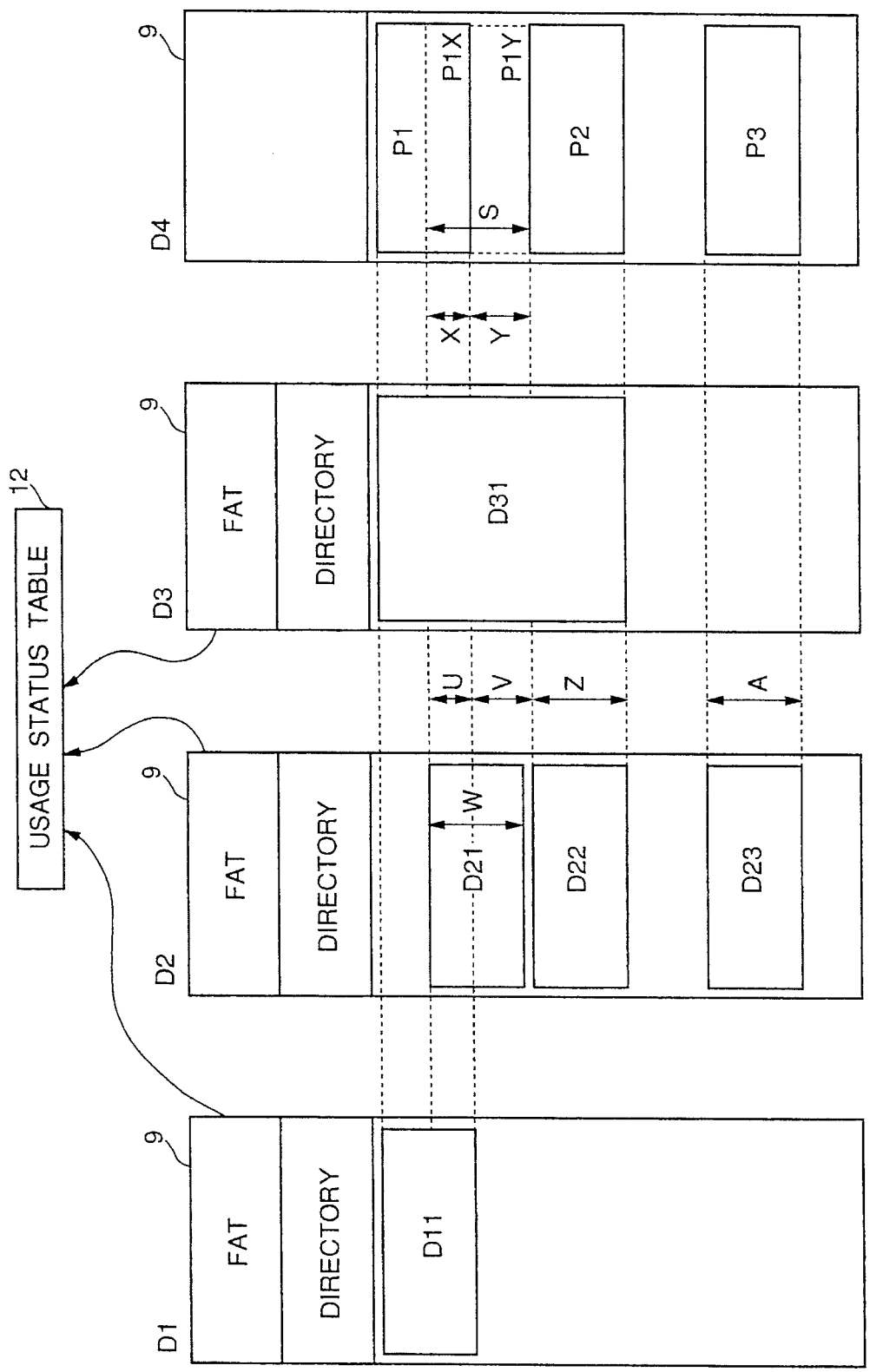
FIG. 11 illustrates the storing and deleting of data.

Referring to FIG. 11, the usage status table 12 is generated from the FAT stored on disks D1, D2, and D3, either by copying or by bit-mapping as described above. The following description starts from a state in which data D22 and D23 are stored on disk D2 but no other data are stored in the file storage areas of disks D1, D2, and D3. In this state, when new data D11 are stored in the area shown on disk D1, since this area is not in use on any of the disks D1, D2, and D3, the new data D11 are written on disk D1 and the same data are written on disk D4 as check information P1.

Next, when new data D22 are stored in the area W on disk D2, by referring to the usage status table 12 the microprocessor 3 sees that this area is not in use on disk D2, but the part of disk D1 corresponding to area U is already in use. Accordingly, while data D21 are being written on disk D2, check information P1X is read from disk D4. New check information is then generated by taking the exclusive logical OR of the check information thus read with part U of the data D21, and the new check information is written back to disk D4 to update P1X. In addition, the contents or part V of data D21 are written as check information on part P1Y of disk D4. The host computer is of course notified that the storage of data D21 is completed when data D21 have been written on disk D2, even if the writing of check information is not complete yet.

Next, when new data D31 are written in the area indicated on disk D3, although this area was not previously in use on disk D3, blocks corresponding to all parts of this area are in use on disks D1 and D2, so the microprocessor 3 directs the disk controllers 8 and check processor 5 to read check information P1 (including P1X), P1Y, and P2 from disk D4, update this check information by taking the exclusive logical OR with data D31, and write the updated check information back to disk D4.

Next the deletion of data D22 and D23 will be described. Operating systems can delete data by several methods, and the microprocessor 3 can be programmed in several ways to handle deletions. Some of these ways lead to inconsistency between the usage status table 12 and FAT, and should be adopted only if the usage status table 12 is stored in non-volatile memory, so that it does not have to be loaded from the FAT at power-up.

One method by which an operating system may delete data is to delete the relevant directory information, clear the corresponding FAT pointers, and physically erase the data by writing initial values such as all zeros. If the host computer's operating system uses this method on data D22, the microprocessor 3 must clear the corresponding information in the usage status table 12 and update the check information P2, e.g. by copying data from D31 to P2.

Some operating systems delete data by clearing their directory information and FAT entries without actually erasing the data. Suppose that data D22 are deleted in this way; if the microprocessor 3 clears the corresponding information in the usage status table 12 to maintain consistency with the FAT, then it must update the check information P2 as described above. However, the microprocessor 3 can be programmed to leave the usage status table 12 unaltered, so that even though data D22 have been deleted, the usage status table 12 continues to indicate that their area is in use. The advantage of this is that the check information P2 does not have to be updated. The disadvantages are that: when new data are written on the area formerly occupied by data D22, it may be necessary to read the old contents of this area to generate new check information; if disk D2 fails, the deleted data D22 will be reconstructed; and the usage status table 12 cannot be loaded from the FAT at the next power-up.

Other operating systems delete data simply by writing a special delete code in the directory information, without either erasing the data or clearing the FAT pointers. If data D22 are deleted in this way, the microprocessor 3 will normally leave the usage status table 12 unaltered, so that it continues to consider the area occupied by the deleted data D22 to be in use, thereby avoiding the need to update the check information P2.

Next the deletion of data D23 will be described. Regardless of the method used by the operating system to delete data D23, the microprocessor 3 should clear the corresponding information in the usage status table 12 to indicate that area A on disk D2 is not in use (unless the operating system does not clear the FAT pointers and the usage status table 12 is stored in volatile memory). Updating of the check information P3 can be omitted, because area A is not in use on disk D1 or disk D3 either.

To summarize, when deleted data are physically erased, or when a deletion frees up an area extending across all data disks in a group, the microprocessor 3 should clear the corresponding information in the usage status table 12 to indicate that the area is no longer in use. For other deletions, the microprocessor 3 can be programmed either to clear the usage status table 12 or to leave the usage status table 12 unaltered, and there are advantages and disadvantages both ways.

Not all operating systems employ a file allocation table; some manage disk space through pointers in directory trees. The foregoing methods remain applicable. The usage status table 12 can be loaded by reading directory information at power-up, and updated by monitoring directory updates by the operating system.

Disks sometimes fail at power-up; thus a disk may fail before the usage status table 12 can be loaded with information indicating which areas on the failed disk were in use. Even if this happens, when replacing the failed disk with a standby disk, it is not necessary to reconstruct the entire contents of the failed disk; data reconstruction can be limited to the necessary areas by the procedure described next. This procedure will also illustrate the directory-tree method of disk area management.

Figure 12:
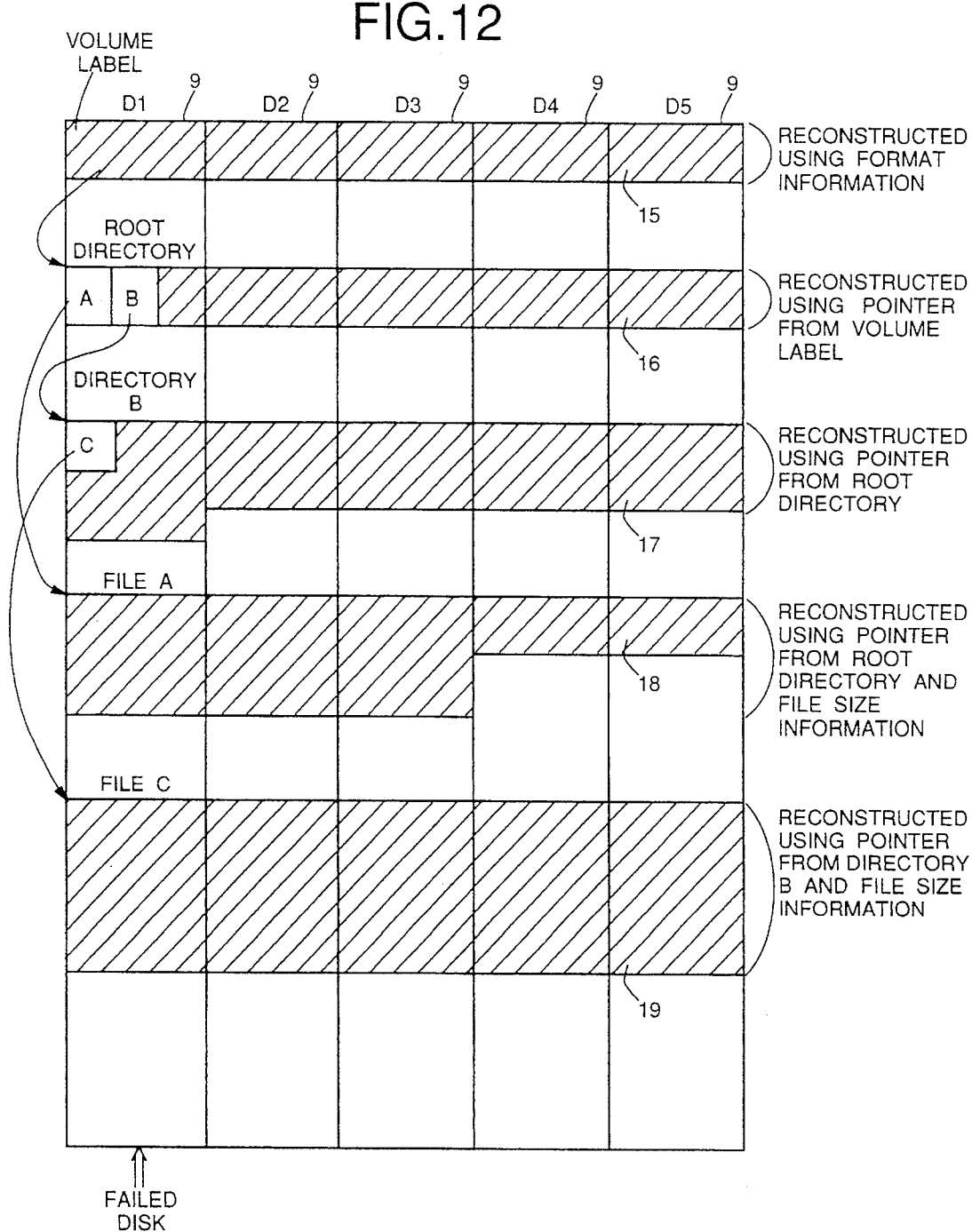
FIG. 12 illustrates the reconstruction of data on a failed disk, using a directory tree.

Referring to FIG. 12, consider a group of five disks storing both data and check information, so that if any one disk fails, its data can be reconstructed from the other four disks. In the drawing, these five physical disks are presented to the operating system of the host computer 13 as a single logical volume. At the top of the drawing is a volume label 15, extending across all five disks, containing information such as the volume name and a pointer to a root directory 16. The root directory 16 contains further pointers: in the drawing, a pointer to a file A and a pointer to a directory B 17. Directory B, which is a subdirectory of the root directory 16, contains a pointer to a file C. Files A and C are stored in the areas 18 and 19 indicated by shading. The directory entries for files A and C contain not only the pointers indicated in the drawing, but also the file name, attribute, file size, and possibly other information.

The volume label 15, root directory 16, and subdirectory 17 are collectively referred to as system information, meaning theft they are generated by the operating system running on the host computer.

If disk D1, for example, fails at power-up and the usage status table 12 is not available, the microprocessor 3 is programmed to reconstruct the data on disk D1 as follows. First by reading the volume label information from the four good disks D2, D3, D4, and D5, it reconstructs the volume label information of disk D1. Then it reads the pointer indicating the location of the root directory 16 and reconstructs the root directory information on disk D1 in the same way. Next it reads the pointer to file A and the file size of file A from the root directory, computes from this information where file A was stored on disk D1, and reconstructs this part of disk D1 by reading the corresponding parts of the four good disks. Next it does the same for subdirectory B. Then it reads the pointer and file size of file C from subdirectory B and reconstructs the part of file C that was stored on disk D1. By tracing pointers in this way, the microprocessor 3 can reconstruct all the data that were stored on disk D1 without having to reconstruct parts of disk D in which no data were stored. Reconstruction of deleted data can also be avoided, if so desired, by recognizing delete codes in the directory entries of files. As each block is reconstructed, it is written on a standby disk not shown in the drawing.

To carry out the above procedure, the microprocessor 3 should be provided, in firmware, with the formats of the volume label 15 and directories 16 and 17. If the redundant disk array is used by more than one operating system, the microprocessor's firmware should contain the formats employed by all the relevant operating systems, and the host computer 13 should instruct the microprocessor 3 which format to follow in recovering from the disk failure.

The description so far has shown how the reading of old data, before overwriting the old data with new data, can be omitted whenever the new data is written on an unused area. The reading of old data can also be omitted, obviously, whenever check information can be generated entirely from the new data: for example, when new data are written on corresponding blocks across all data disks in a group; or when data are present on only one of the blocks, and new data are overwritten on that block. The procedure to be described next, however, enables the reading of old data and old check information to be omitted in all cases. This procedure can be employed either in addition to or in place of the methods described above.

Figure 13:
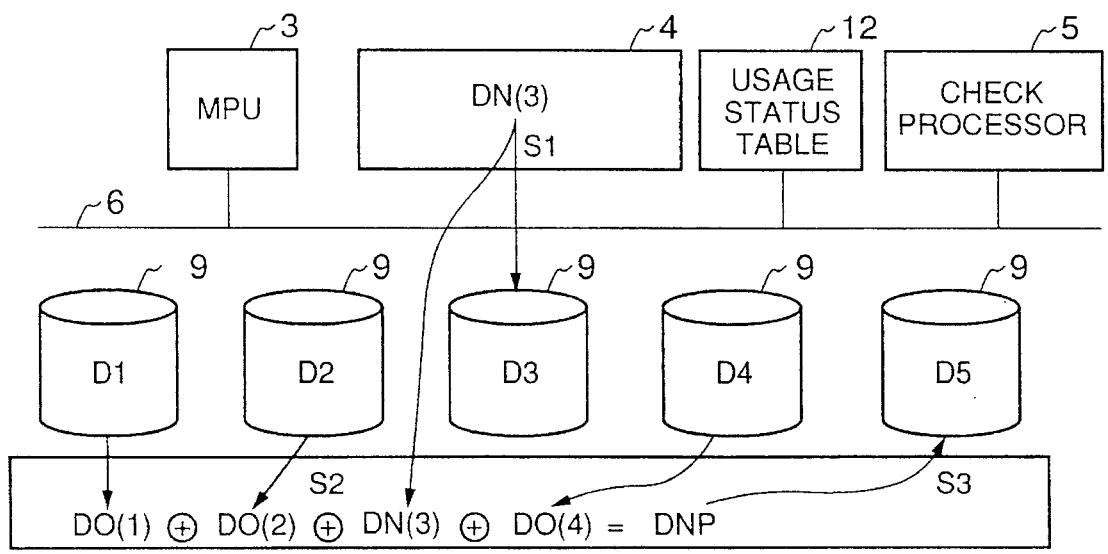
FIG. 13 illustrates a method of writing new data without reading old data in advance.

Referring to FIG. 13, new data DN(3) are received from the host computer 13 and stored in the memory 4, to be written on disk D3. By consulting the usage status table 12, the microprocessor 3 finds that the area in which DN(3) will be written is already in use (e.g., the host computer is updating an existing file), and that the corresponding areas on disks D1, D2, and D4 are also in use, with check information stored on disk D5. In step S1, the microprocessor 3 commands a channel controller (omitted from the drawing) to write the new data DN(3) on disk D3, and notifies the host computer when storage of the data has been completed. Then, in step S2, the microprocessor 3 commands old data DO(1), DO(2), and DO(4) to be read from the corresponding areas on disks D1, D2, and D4, and the check processor 5 computes new check information DNP, by taking the exclusive logical OR of the old data DO(1), DO(2), and DO(4) with the new data DN(3). Finally, in step S3, the microprocessor 3 commands the new check information DNP to be written on disk D5.

The microprocessor 3 is preferably programmed to execute steps S1, S2, and S3 as separate tasks, step S1 being performed as a foreground task and steps S2 and S3 as background tasks. Foreground tasks have higher priority than background tasks, so that if tasks of both types are waiting to be executed, the foreground task is executed first. Thus new data will always be written as quickly as possible, and check information will be updated when the microprocessor 3 is not occupied with other tasks.

Figure 14:
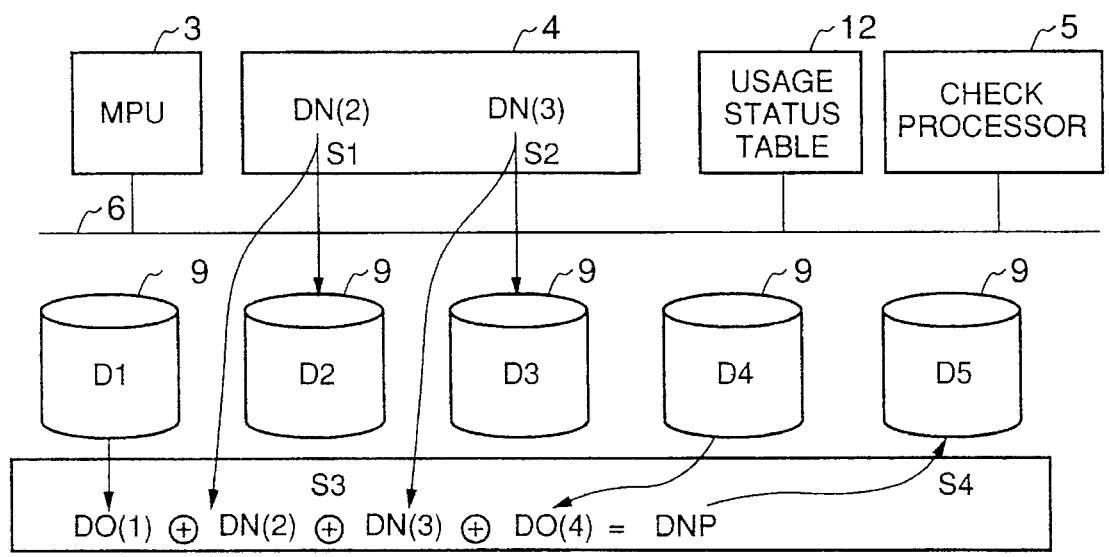
FIG. 14 illustrates another method of writing new data without reading old data in advance.

FIG. 14 shows another example of this procedure. New data DN(2) to be stored in the array are first received from the host computer and placed in the memory 4. In step S1 these data are written on disk D2 and the host computer is notified of completion. Before the microprocessor 3 can execute the tasks for generating and writing new check information, however, the host computer sends further new data DN(3) to be stored in a corresponding area on disk D3. As soon as data DN(3) arrive, in step S2 the microprocessor 3 commands these data to be written on disk D3. Then if no more data arrive from the host computer, the microprocessor 3 proceeds to step S3, in which old data DO(1) and DO(4) are read from the corresponding areas on disks D1 and D4 and the check processor 5 computes new check information DNP by taking the exclusive logical OR of DO(1) and DO(4) with DN(2) and DN(3), which are still held in the memory 4. Finally, in step S4 the new check information DNP is written on disk D5. Steps S1 and S2 are performed in foreground, and steps S3 and S4 in background.

The microprocessor 3 is preferably programmed to wait for a certain interval to see if further commands to store data will be received from the host computer before proceeding to the tasks of reading old data from the disks, computing new check information, and writing the new check information. This interval can be adjusted to obtain a desired trade-off between efficiency and reliability.

Alternatively, instead of computing and storing check information in response to individual data store commands, the microprocessor 3 can be programmed to compute and store check information at regular intervals of, for example, one minute, one hour, one day, or one week. The length of these intervals can also be selected according to desired efficiency and reliability, short intervals being suitable if high reliability is required.

If the interval is long, it may be easiest to compute and store check information for all disk areas that are in use at the designated interval; that is, for all data currently stored in the group of disks. If the interval is short, it is preferable to store, in the memory 4 for example, information indicating which disk areas have been updated, and skip the updating of check information blocks if none of the corresponding data blocks have been updated in the preceding interval.

Figure 18:
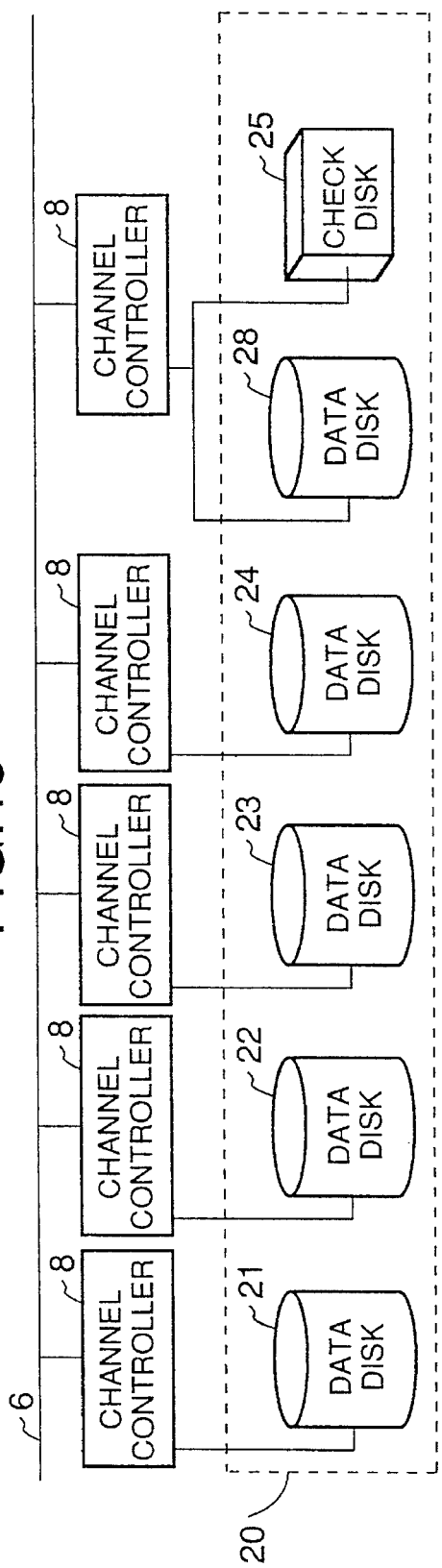
FIG. 18 illustrates the mirroring of check information on a rotating disk and a solid-state disk.

The methods illustrated in FIGS. 18 and 14 of delayed writing of check information, or of writing check information at periodic intervals, can be applied even in systems without a usage status table 12. In that case, when a check information block is updated, the new check information is generated from all corresponding data blocks, regardless of their usage status.

Figure 15:
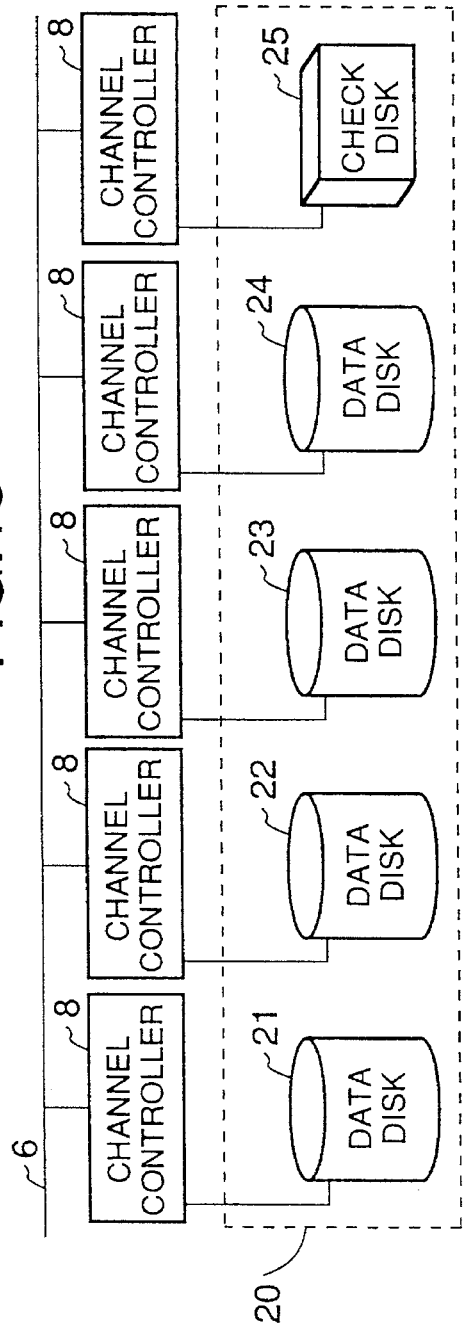
FIG. 15 illustrates a group of disks with a solid-state check disk.
Figure 16:
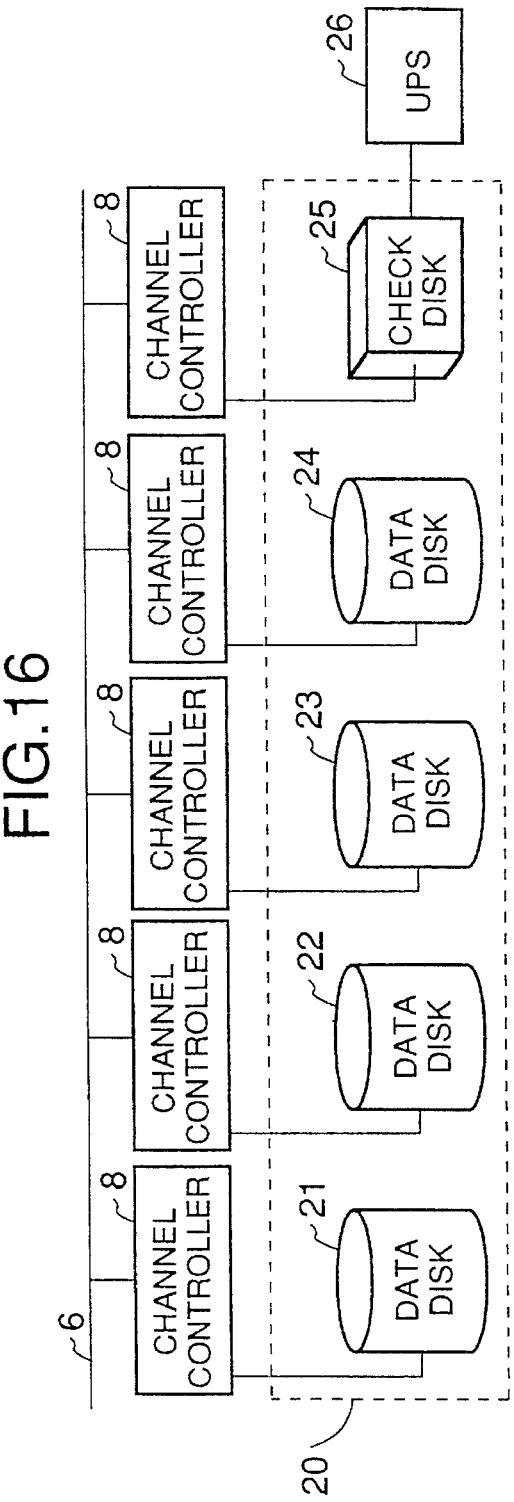
FIG. 16 illustrates a group of disks with a solid-state check disk powered by an uninterruptible power supply.
Figure 17:
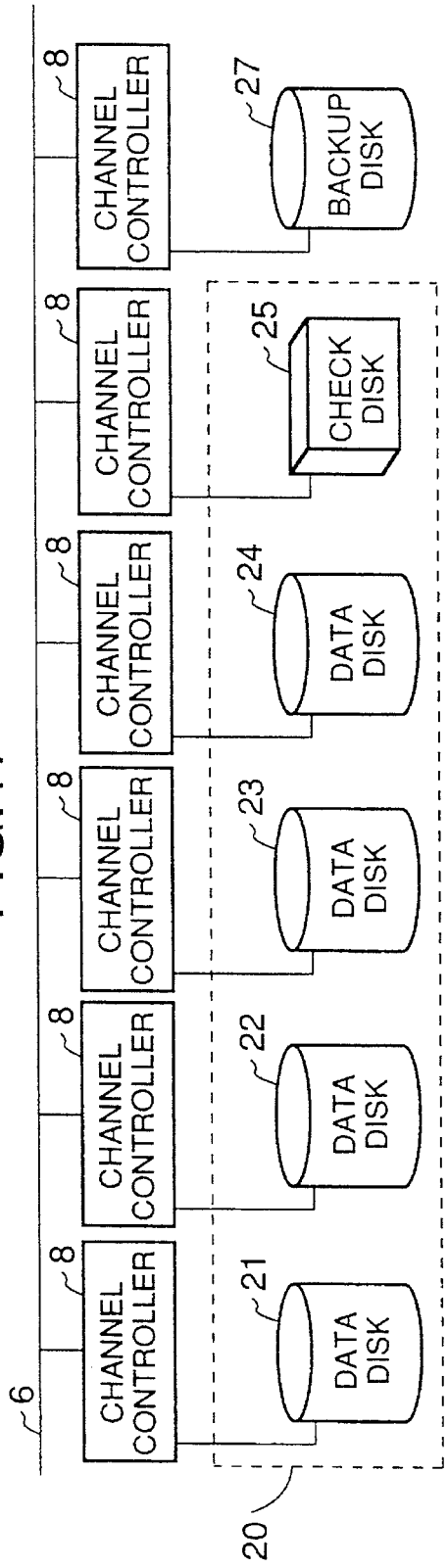
FIG. 17 illustrates a group of disks with a solid-state check disk having a rotating backup disk.

Finally, a method of further speeding up the writing of check information when there is one check disk per group will be described, with reference to FIGS. 15, 16, 17, and FIG. 15 shows a single group 20 of disks comprising four data disks 21, 22, 23, and 24 and one check disk 25. The data disks 21, . . . , 24 are rotating media, such as rotating magnetic disks. The check disk 25 is a solid-state disk comprising semiconductor memory devices, such as flash memory or DRAM. A solid-state disk has no rotational delay, and can be accessed air very high speed. Each disk in FIG. 15 has its own disk controller 8, coupled to the data bus 6; other components of the array system are as shown in FIG. 1.

Even though all accesses to check information are concentrated on the single check disk 25, the high access speed of the check disk 25 prevents access bottlenecks. A solid-state check disk is particularly advantageous when old check information must be read in order to generate new check information. With a rotating disk, after reading the old check information it would be necessary to wait for disk rotation to bring the same area under the read-write head again; with a solid-state check disk there is no such rotational delay.

If the solid-state check disk 25 comprises non-volatile memory elements such as flash memory it will retain its check information even when power goes off. If the disk 25 comprises volatile memory elements such as DRAM, however, the check information will be lost when power is switched off, or if there is a momentary power failure. The lost check information can be restored, however, by reading the corresponding data from the data disks 21, . . . , 24 and performing, for example, an exclusive logical OR operation. The microprocessor 3 in the array controller can be programmed to load the solid-state check disk 25 with check information generated in this way at power-up, or after a power failure.

Referring to FIG. 16, to prevent loss of data due to momentary power failures, the solid-sate check disk 25 can be provided with an uninterruptible power supply 26, a well-known device that delivers power continuously even if its own source of power is momentarily cut off. The uninterruptible power supply 26 can be left on permanently, even when the data disks 21, . . . , 24 and other parts of the redundant array are powered off, so that check information is retained at all times.

An alternative method of retaining check information, shown in FIG. 17, is to save the check information to a rotating backup disk 27 before power is switched off. The microprocessor 3 in the array controller can also be programmed to save check information to the backup disk 27 at regular intervals during normal operation, as protection against power failures.

Referring to FIG. 18, instead of being backed up at regular intervals, the check information can be mirrored on both a rotating check disk 28 and a solid-state check disk 25. To indicate that the same information is written on both disks 25 and 28, the drawing shows both disks coupled to the same channel controller 8, although in actual system configurations each disk may of course have its own channel controller. The advantage of FIG. 18 over FIG. 17 is that the contents of the two check disks 25 and 28 are always in substantial agreement reducing the chance that check information will be lost through a power failure.

When check information is read in FIG. 18, the solid-state check disk 25 is read in preference to the rotating check disk 28. Normally, the rotating check disk 28 is used as a write-only disk. The rotating check disk 28 is read only if check information is not available on the solid-state disk 25, as at power-up, or after a power failure. For example, the rotating check disk 28 can be read in order to load check information into the solid-state check disk 25 at power-up.

Because of the high access speed of the solid-state check disk 25, it can be both written and read in the time it takes to write check information on the rotating check disk 28. Consider, for example, a write access to data disk 21 followed by a separate write access to data disk 22, both accesses requiring that old check information be read in order to generate new check information. First, old check information for the access to disk 21 is read from the solid-state check disk 25 and new check information is generated. Next, while this new check information is being written on the rotating check disk 28, the same new check information is written on the solid-state check disk 25, then old check information for the access to disk 22 is read from the solid state-disk 25. By the time the writing of the check information for disk 21 has been completed on the rotating check disk 28, new check information for disk 22 has already been generated, so writing of this new check information on the rotating check disk 28 can begin immediately. By reading check information from the solid-state check disk 25, in normal operation the array in FIG. 18 can operate up to twice as fast as a conventional array having only a rotating check disk 28.

In the preceding description, because any necessary old check information can be read quickly from the solid-state check disk 25, the writing off data on the data disks 21, . . . , 24 and the writing of the corresponding check information on the rotating check disk 28 can be carried out nearly simultaneously. Alternatively, the writing of data on the data disks 21, . . . , 24 and the writing of check information on the solid-state check disk 25 can be carried out as foreground tasks, and the writing of check information on the rotating check disk 28 as a background task. In either case, the host computer 13 should be notified that the storing of data has been completed as soon as the data have been written on the data disks 21, . . . , 24.

Although the check information discussed above has been parity information, requiring only one check disk per group, the invented methods of storing and recovering data can easily be adapted to Hamming codes and other types of check information, which may require more than one check disk per group. Those skilled in the art will readily see that further modifications can be made to the methods described above without departing from the scope of the invention as claimed below.

What is claimed is:

1. A method of storing data in a redundant array of disks, comprising the steps of:

partitioning said redundant array of disks into a plurality of areas, each area being a portion of one disk of the redundant array of disks, wherein each area has a size which is one of at least two different sizes;

receiving a command to store a quantity of data in said redundant array;

selecting at least one area of the plurality of areas so that a sum of the size of the selected at least one area is adequate to store said quantity of data, and the number of the selected at least one area is minimized; and storing said quantity of data in the selected at least one area.

2. The method of claim 1, wherein, for each disk, areas having an identical size are disposed in contiguous locations on said disk.

3. The method of claim 1, wherein, for each disk, areas having an identical size are disposed in at least partly non-contiguous locations on said disk.

4. The method of claim 1, further comprising the step of providing, in a semiconductor memory, an area table having pointers to the plurality of areas.

5. The method of claim 1, wherein the step of partitioning is carried out prior to the step of storing said quantity of data.

6. The method of claim 1, wherein the step of partitioning said redundant array of disks into the plurality of areas includes the steps of:

initially partitioning the redundant array of disks into a plurality of blocks having uniform sizes; and combining selected contiguous blocks to form each of the plurality of areas as commands to store different quantities of data are received.

7. The method of claim 1, wherein said redundant array of disks has a group of disks and wherein the step of partitioning said redundant array includes:

partitioning each disk in the group of disks identically to form a plurality of groups of areas, each group of areas having one corresponding area on each disk in the group of disks; and designating one area in each of said groups of areas for storing check information for other areas in the group of areas.

8. The method of claim 7, wherein all areas designated for storing check information are disposed on a single disk in said group of disks.

9. The method of claim 7, wherein areas designated for storing check information are distributed over all disks in said group of disks.

10. The method of claim 1, wherein the redundant array of disks includes a first disk, wherein the step of selecting the at least one area includes selecting a first area on the first disk, and wherein the step of storing said quantity of data in the selected at least one area includes storing said quantity of data on the first area on the first disk.

11. A redundant array of disks, comprising:

a plurality of disks for storing data, partitioned into a plurality of areas, each area being a portion of one disk of the redundant array of disks, wherein each area has a size which is one of at least two different sizes;

a first semiconductor memory for storing new data received from a host computer;

a second semiconductor memory for storing an area table having a plurality of pointers corresponding to areas of different sizes, among said plurality of areas; and a microprocessor to refer to said area table to select at least one area of the plurality of areas so that a sum of the size of the selected at least one area is adequate to store said new data, and the number of the selected at least one area is minimized, and to write said new data on the selected at least one area.

12. The array of claim 11, wherein, for each disk, areas having an identical size are disposed in contiguous locations on said disk.

13. The array of claim 11, wherein, for each disk, areas having an identical size are disposed at least partly in non-contiguous locations on said disk.

14. The array of claim 11, wherein each disk is partitioned into blocks of uniform size, and said microprocessor combines contiguous blocks to form the plurality of areas.

15. The array of claim 11, wherein said array has a group of disks such that:

each disk is partitioned in the group of disks identically to form a plurality of groups of areas, each group of areas having one corresponding area on each disk in the group of disks; and one area is designated in each of said groups of areas for storing check information for other areas in the group of areas.

16. The array of claim 15, wherein all areas designated for storing check information are disposed on a single disk in said group of disks.

17. The array of claim 15, wherein areas designated for storing check information are distributed over all disks in said group of disks.

18. The array of claim 11, wherein the plurality of disks includes a first disk, wherein the plurality of areas includes a first area on the first disk, and wherein the microprocessor includes circuitry to select the first area, and to write said new data on the first area.

* * * * *